US010185754B2

(12) United States Patent
Sankhla et al.

(10) Patent No.: US 10,185,754 B2
(45) Date of Patent: Jan. 22, 2019

(54) DISCERNING HUMAN INTENT BASED ON USER-GENERATED METADATA

(71) Applicant: Vocus NM LLC, Beltsville, MD (US)

(72) Inventors: Vishal Harshvardhan Sankhla, Santa Clara, CA (US); Rajeev Anand Kadam, San Jose, CA (US)

(73) Assignee: VOCUS NM LLC, Beltsville, MD (US)

( * ) Notice: Subject to any disclaimer, the term of this patent is extended or adjusted under 35 U.S.C. 154(b) by 0 days.

(21) Appl. No.: 14/138,718

(22) Filed: Dec. 23, 2013

(65) Prior Publication Data

US 2014/0114959 A1    Apr. 24, 2014

Related U.S. Application Data

(63) Continuation of application No. 12/889,267, filed on Sep. 23, 2010, now Pat. No. 8,635,227.

(60) Provisional application No. 61/369,699, filed on Jul. 31, 2010.

(51) Int. Cl.
*G06F 17/30* (2006.01)

(52) U.S. Cl.
CPC .. *G06F 17/30554* (2013.01); *G06F 17/30699* (2013.01); *G06F 17/30702* (2013.01); *G06F 17/30867* (2013.01)

(58) Field of Classification Search
CPC ........... G06F 17/30867; G06F 17/3089; G06F 17/30011; G06F 17/30029; G06F 17/30058; G06F 17/30554; G06F 17/30699; G06F 17/30864; G06F 17/30056; G06F 17/30675; G06F 17/30; G06F 17/30483; G06F 17/30557; G06F 17/30702
USPC .................................................. 707/741, 769
See application file for complete search history.

(56) References Cited

U.S. PATENT DOCUMENTS

| | | | |
|---|---|---|---|
| 7,207,011 B2 | 4/2007 | Mulvey et al. | |
| 7,603,350 B1* | 10/2009 | Guha | |
| 7,756,755 B2* | 7/2010 | Ghosh et al. | ................ 705/26.1 |
| 7,873,638 B2 | 1/2011 | Young et al. | |
| 8,086,440 B2 | 12/2011 | Elliot et al. | |
| 8,140,335 B2 | 3/2012 | Kennewich et al. | |
| 8,145,910 B1* | 3/2012 | Gupta | ................ G06Q 10/0633 713/178 |
| 8,204,884 B2 | 6/2012 | Freedman et al. | |

(Continued)

OTHER PUBLICATIONS

U.S. Appl. No. 14/138,731, filed Dec. 23, 2013, Vishal Harshvardhan Sankhla, Determining Demographics Based on User Interaction.

(Continued)

*Primary Examiner* — Scott A. Waldron
*Assistant Examiner* — Andalib F Lodhi
(74) *Attorney, Agent, or Firm* — Polsinelli LLP

(57) ABSTRACT

Methods and systems for discerning human intent based on user-generated metadata are provided. Communications from a plurality of social networks are evaluated to determine whether they are associated with contexts indicative of user intent. When a social network communication is determined to be associated with such a context, a tag may be generated associating the social network communication with the indicated human intent. In addition, information regarding the social network communication may be exported to an application responsible for responsive action.

21 Claims, 2 Drawing Sheets

(56) References Cited

U.S. PATENT DOCUMENTS

| | | | |
|---|---|---|---|
| 8,250,096 B2* | 8/2012 | Su et al. | 707/783 |
| 8,473,624 B2 | 6/2013 | Mart et al. | |
| 8,631,122 B2 | 1/2014 | Kadam et al. | |
| 8,635,227 B2 | 1/2014 | Sankhla et al. | |
| 8,731,901 B2 | 5/2014 | Srihari et al. | |
| 9,076,125 B2 | 7/2015 | Manolescu et al. | |
| 9,514,435 B2* | 12/2016 | Nguyen | G06Q 10/10 |
| 2004/0088210 A1* | 5/2004 | Tsyganskiy | G06Q 30/02 705/7.33 |
| 2005/0108017 A1 | 5/2005 | Esser et al. | |
| 2006/0020662 A1 | 1/2006 | Robinson | |
| 2006/0242126 A1* | 10/2006 | Fitzhugh | 707/3 |
| 2006/0249576 A1 | 11/2006 | Nakada et al. | |
| 2006/0253316 A1* | 11/2006 | Blackshaw | G06F 17/30867 705/7.32 |
| 2007/0271234 A1 | 11/2007 | Ravikiran | |
| 2007/0294240 A1* | 12/2007 | Steele | G06F 17/30696 |
| 2008/0059282 A1 | 3/2008 | Vallier et al. | |
| 2008/0114737 A1* | 5/2008 | Neely | G06Q 10/107 |
| 2008/0147487 A1* | 6/2008 | Hirshberg | G06Q 30/02 705/14.53 |
| 2008/0215607 A1 | 9/2008 | Kaushansky et al. | |
| 2008/0221892 A1 | 9/2008 | Nathan et al. | |
| 2009/0119173 A1* | 5/2009 | Parsons | G06Q 10/107 705/319 |
| 2009/0119324 A1* | 5/2009 | Simard et al. | 707/102 |
| 2009/0157482 A1 | 6/2009 | Jung et al. | |
| 2009/0164926 A1 | 6/2009 | Boyle et al. | |
| 2009/0327120 A1 | 12/2009 | Eze et al. | |
| 2010/0042470 A1 | 2/2010 | Chang et al. | |
| 2010/0114654 A1 | 5/2010 | Lukose et al. | |
| 2010/0114935 A1 | 5/2010 | Polo-Malouvier et al. | |
| 2010/0119053 A1 | 5/2010 | Goeldi | |
| 2010/0174813 A1 | 7/2010 | Hildreth et al. | |
| 2010/0198757 A1* | 8/2010 | Cheng | G06Q 10/10 706/12 |
| 2010/0287049 A1 | 11/2010 | Rousso et al. | |
| 2010/0293566 A1 | 11/2010 | Valdez | |
| 2011/0022621 A1* | 1/2011 | Luo et al. | 707/769 |
| 2011/0055017 A1 | 3/2011 | Solomon et al. | |
| 2011/0055196 A1 | 3/2011 | Sundelin et al. | |
| 2011/0055264 A1 | 3/2011 | Sundelin et al. | |
| 2011/0055336 A1 | 3/2011 | Park et al. | |
| 2011/0078173 A1 | 3/2011 | Seligmann et al. | |
| 2011/0082824 A1 | 4/2011 | Allison et al. | |
| 2011/0145052 A1 | 6/2011 | Lin et al. | |
| 2011/0191372 A1 | 8/2011 | Kaushansky et al. | |
| 2012/0030210 A1 | 2/2012 | Sankhla | |
| 2012/0047219 A1 | 2/2012 | Feng et al. | |
| 2012/0110071 A1 | 5/2012 | Zhou et al. | |
| 2012/0136959 A1 | 5/2012 | Kadam | |
| 2012/0197852 A1 | 8/2012 | Dutta et al. | |
| 2012/0197911 A1 | 8/2012 | Banka et al. | |
| 2012/0197934 A1 | 8/2012 | Zhang et al. | |
| 2012/0291070 A1 | 11/2012 | Feng et al. | |
| 2013/0014141 A1 | 1/2013 | Bhatia et al. | |
| 2013/0254205 A1 | 9/2013 | Boyle et al. | |
| 2014/0040281 A1 | 2/2014 | Spivack et al. | |
| 2014/0114998 A1 | 4/2014 | Kadam | |
| 2014/0280313 A1 | 9/2014 | Kadam | |

OTHER PUBLICATIONS

U.S. Appl. No. 14/189,863, filed Feb. 25, 2014, Rajeev Anand Kadam, Processing Unstructured Data Streams Using Continuous Queries.
U.S. Appl. No. 12/889,267; Office Action dated Dec. 17, 2012.
U.S. Appl. No. 12/955,899; Final Office Action dated Sep. 12, 2013.
U.S. Appl. No. 12/955,899; Office Action dated Nov. 19, 2012.
U.S. Appl. No. 14/138,731; Final Office Action dated Mar. 24, 2016.
U.S. Appl. No. 14/189,863; Office Action dated Sep. 30, 2016.
U.S. Appl. No. 14/138,731; Office Action dated Aug. 13, 2015.
U.S. Appl. No. 14/189,863; Final Office Action dated Jun. 2, 2017.
U.S. Appl. No. 14/138,731; Final Office Action dated Dec. 28, 2016.
U.S. Appl. No. 14/138,731; Office Action dated Nov. 30, 2017.
U.S. Appl. No. 14/189,863; Office Action dated May 15, 2018.

* cited by examiner

DISCERNING HUMAN INTENT BASED ON USER-GENERATED METADATA

CROSS-REFERENCE TO RELATED APPLICATIONS

The present application is a continuation and claims the priority benefit of U.S. patent application Ser. No. 12/889,267 filed Sep. 23, 2010, which claims the priority benefit of U.S. provisional application 61/369,699 filed Jul. 31, 2010, the disclosures of which are incorporated herein by reference.

BACKGROUND OF THE INVENTION

Field of the Invention

The present invention generally relates to data analysis. More specifically, the present invention relates to discerning human intent based on analysis of user-generated metadata.

Description of the Related Art

More than a half billion users generate large amounts of data each day on social media networks such as Twitter®, Facebook®, MySpace®, and Foursquare®. Users from around the globe post photos, videos, text (e.g., status updates and blogs), and other information at exponentially increasing rates. Online social networks have become communication hubs where users exchange information regarding their daily activities, political views, cravings, product complaints, family issues, and general interests and musings.

This user-generated metadata can be harvested and analyzed to detect areas where business can improve the services and products they offer. There presently exists monitoring technology that allows organizations to gather large amounts of metadata from third party services such as micro-blogging, photo sharing, blogging, and other social networking sites. With the aforementioned growth of such social networking sites, however, the sheer amount of metadata being generated now makes it next to impossible for a human operator to manually review and export aggregated data in a time-efficient manner.

The detection and handling of sales leads, support requests, and product feedback is currently a manual process in which raw data generated from social media networks is individually analyzed, tagged, and exported to a customer relationship management (CRM) or support system by human operators. This process is extremely time-consuming and expensive due to the tremendous amount of information generated each day by social media networks, as well as the amount of human labor required to analyze and process such information. The ability to accurately identify and process this information by manual means alone is nearing a point of impossibility.

There is a need in the art for a system that can be completely automated, intelligent, and aware of different inter-departmental systems within the enterprise where data can be exported for further processing.

SUMMARY OF THE PRESENTLY CLAIMED INVENTION

Embodiments of the present invention provide methods and systems for discerning human intent based on user-generated metadata. Communications from a plurality of social networks are evaluated to determine whether they are associated with contexts indicative of user intent. For example, when a social network communication is determined to include a keyword associated with such a context, a tag may be generated associating the social network communication with the indicated human intent. In addition, information regarding the social network communication may be exported to an application responsible for responsive action.

Some embodiments include methods for discerning human intent based on user-generated metadata. Such methods may include maintaining in memory information regarding certain contexts indicative of human intent, accessing a plurality of social networks that publish a plurality of social network communications, determining that the social network communications is associated with the one or more contexts, identifying the human intent, and generating a tag associating the social network communication with the identified human intent.

Additional embodiments include systems for discerning human intent based on user-generated metadata. Such systems may include a memory for storing information regarding one or more contexts indicative of human intent, a network interface for accessing a plurality of social networks that publish a plurality of social network communications, and a processor for executing instructions for determining that one or more social network communications is associated with the one or more contexts indicative of human intent, identifying the human intent, and generating a tag regarding the social network communication and the identified human intent.

In further embodiments of the present invention, computer-readable storage media is provided. Embodied on such computer-readable storage media may be a program that is executable by a processor to perform a method for discerning human intent based on user-generated metadata.

DETAILED DESCRIPTION

Methods and systems for discerning human intent based on user-generated metadata are provided. Businesses are generally interested in gathering useful information about their customers. Such customers may publish a great deal of information on various social networks on the Internet. Much of the published information may not be relevant to the business. As such, there is a need to efficiently evaluate information for relevance to a particular concern.

Various embodiments of the present invention allow for communications published in a plurality of social networks to be evaluated for the presence of designated contexts indicative of certain user intent. Upon finding a keyword associated with such a context, for example, a tag may be generated associating the social network communication with the indicated human intent. In addition, information regarding the social network communication may be exported to an application responsible for responsive action (e.g., CRM, sales lead tracking, service recovery systems). Such a process allows for complete automation (albeit amendable to manual customization/intervention) in processing large quantities of information, as well as evolving intelligence and awareness of different inter-departmental applications and systems to which data can be exported for further processing or responsive action.

Figure 1:
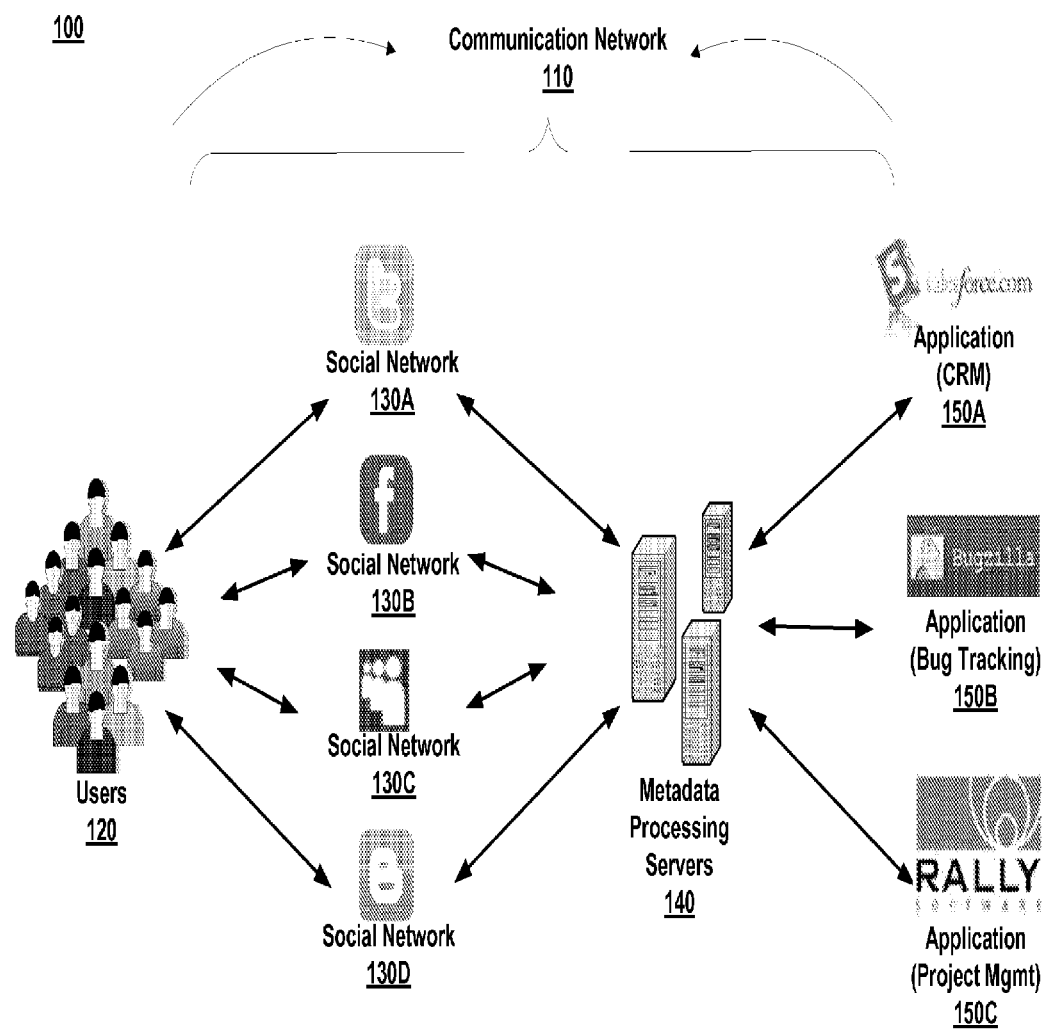
FIG. 1 illustrates a network digital environment in which a system for discerning human intent based on user-generated metadata may be implemented.

FIG. 1 illustrates a network digital environment 100 in which a system for discerning human intent based on user-generated metadata may be implemented. Communicating via communication network 110, users 120 publish communications in various forms to social networks 130A-130D. The published communications are accessed and evaluated by metadata processing servers 140, which may then export information to various applications 150A-150C.

Communication network 110 may be inclusive of any local, proprietary network (e.g., an intranet), as well as any larger wide-area network. The communications network 110 may include a local area network (LAN), for example, which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of digital environment 100.

Users 120 may communicate through communication network 110 using any number of different electronic client or end-user devices such as a general-purpose computer, a mobile device such as a cellular phone, smartphone, a personal digital assistant (PDA), as well as a netbook (i.e., a miniature laptop computing device). Such users 120 may include any individual or group of individuals who voluntarily provides information to various forums.

Such forums may include various social networks (e.g., social networks 130A-130D). Social networks generally provide tools that allow users 120 to create, manage, and maintain collections of relationships with other users 120 in a virtual environment. Social networks further allow users 120 to encounter, interact with, and connect with new acquaintances and join virtual communities in a particular social network. To support such functions, social networks allow for exchange of various forms of published communications among users 120. Such communications may include textual information (e.g., status updates, hyperlinks, bookmarks, blogs, microblogs, forum posts, comments), photos, and video. Each communication may either explicitly or implicitly provide data that may be used to discern user intent.

A user on an online micro-blogging service may explicitly post that he is in the market for a new phone. Alternatively, a user may imply the same by posting that the phone she currently has does not operate in the manner desired. Similarly, such a user may also post a photo of a phone that she wants and/or provide a link to a vendor website where such a phone may be purchased. Specifically, a photo of a new phone may be associated with a name or tag indicating that the subject matter is a phone and/or the type of phone. In addition, the photo may be tagged by the user as part of a "wishlist." The phone may also be identified as such in accompanying text or comments responsive to the photo.

Each of these communications includes or refers to information that indicates that the user has a need or desire for a new phone. In some instances, the user has further expressed a desire for a particular phone. In another instance, the user has provided feedback about a particular phone. Such metadata may be extracted or extrapolated from the communication and/or surrounding communications.

Depending on the business, a dealer or manufacturer of phones may be interested in such a user as a potential customer, either to replace the phone with a working model or a competitor model. Alternatively, the manufacturer of the poorly reviewed phone may wish to address the dissatisfied customer complaint or provide technical support. In yet another circumstance, the manufacturer may use the information to determine whether there is a flaw in design, manufacture, or other aspect of the phone.

Metadata processing servers 140 can access communications that are published within any of the social networks 130A-130D (e.g., by downloading a feed, such as a firehouse feed or garden hose feed) and evaluate such communications for indications of human intent that are relevant to a particular party (e.g., phone dealer). Metadata processing servers 140 may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Referring to the above example, a particular business (e.g., phone dealer) may be interested in obtaining sales lead information regarding potential customers. A phone dealer may wish to send identified leads information regarding sales or new phone models in the hopes of generating a sale. For example, the phone dealer may designate certain keywords that are of interest (e.g., "phone," "telephone," "cell phone," "iPhone"). For the particular business, metadata processing servers 140 may therefore access one or more designated social networks and search communications within such social networks for the designated keywords associated with a context indicative of an intent to buy.

Just because a user mentions a keyword does not mean that the user is in the market for a phone. For example, the user may simply be noting that she called a friend "on the phone," "forgot [her] phone today," is listening to a song titled "Telephone," or utilizing a keyword in some other context that is not indicative of an intent to buy or amenability to receiving sales-related information. It is therefore not enough to search social network communications for certain keywords; the keywords' appearance in a particular context is what indicates a certain human intent. It is the particular human intent (e.g., desire for new phone, complaint about current phone) with respect to the keyword that is relevant to the phone dealer. Such intent may be discerned, for example, by identifying certain contexts in which the keywords appear.

The metadata processing servers 140 makes use of machine learning, artificial intelligence (AI), natural language process (NLP), Bayesian filters and classifiers, and advanced information processing systems to identify human intent from the context of one or more comments, posts, mentions, or metadata. For example, metadata processing servers 140 may have identified certain contexts as being indicative of desire or openness to buy. Such contexts may include additional keywords or metadata (e.g., "want," "want a new," "wish," "wishlist," "hate my") in surrounding or responsive communications. Communications that may have been published in the same timeframe, for example, may shed light on what a neighboring communication means.

For example, if the blog post was a complaint of product X, it could be a sales lead for the competitor of product X, it could also serve as a support request for the company that owns product X, or it could also be treated as a product enhancement request or a flaw with product X. Using other monitoring solutions on the market, it would take enormous amount of time for an operator to manually evaluate and forward this information for response from the appropriate entity. Metadata processing servers 140 may be able, however, to identify from surrounding communications whether the product complaint conveys customer dissatisfaction with the product itself or with accessories or accompanying services provided by other vendors/service providers.

Data may be stored locally in a database associated with metadata processing servers 140. Alternatively or in addition, data can be exported to a variety of applications 150A-150C for further processing or response. An enterprise may implement many types of applications 150A-150C to handle various action items (e.g., support requests or sales leads). By automatically identifying human intent in aggregated public metadata, organizations can increase revenue and customer satisfaction dramatically. Applications 150A-150C that may have use for such intent data may include CRM systems for managing contacts and sales leads, support systems for tracking support requests and support-related issues, bug reporting systems for managing and tracking bugs, HR systems for managing employees and job applicants, ad serving systems for managing advertising, content management systems, product or project management systems, and notification systems.

Applications 150A-150C may be a system associated with one or more partners. A partner may be any entity with a business interest in receiving information regarding the keyword and the identified human intent with which the keyword is associated. For example, a particular mobile phone provided by a manufacturer may be referenced in a blog posted by a user in one of the social networks 130. As such, a partner may wish to track various types of information regarding its product for sales, quality control, and service recovery purposes, for example.

Such information may be processed and included in compilations sent or exported to any applications 150A-150C associated with the partner. Such applications 150A-150C may include CRM systems 150A (e.g., Salesforce®), bug tracking systems application 150B (e.g., Bugzilla®), or project management systems 150C (e.g., Rally®), which may reside within the enterprise or exist as an online service. Other possible applications 150 that may receive such information include databases/data warehousing systems, reporting/analytics systems, business intelligence systems, support management systems, human resources systems, and project/product management systems.

Metadata processing servers 140 may export identified data as a file (e.g., Microsoft Word®, Excel®, PDF, XML, JSON, SMS, email) to any of the applications 150A-150C automatically, periodically, and/or upon request. The particular parameters for aggregating, organizing, and formatting such exported data may be specified by the specific partner requesting such information.

In addition, the particular application to which certain information may be sent depends on the particular intent. For example, communications regarding intent to buy are relevant to CRM systems 150A. As such, information regarding such communications may be sent to a partner's CRM system 150A with instructions for responsive action (e.g., following up on sales leads). Where a human intent may be associated with multiple action items (e.g., a customer complaint may indicate both intent to replace and a design flaw), information may be sent to both a CRM system 150A, as well as a bug tracking system 150B and project management system 150C.

John Doe may post a message, for example, on his Twitter® feed that "My Laptop just broke." Metadata processing servers 140 may flag the post, optionally review previous posts for additional context, (e.g., "Do NameBrand laptops normally smoke when you boot up?"), and aggregates such metadata from John and processes it as a sales lead or product complaint. Such information may be exported out automatically to a CRM system 150A, which may consider John a new prospective customer in the market for a new laptop so that a corporate representative can reach out to John for laptop deals or service offers.

A few days following the original tweet, however, John Doe may post a message on his Twitter® feed, "I love my new MacBook Pro." Metadata processing servers 140 monitor and identify that John has already bought a new laptop, indicating that contacting John now with laptop deals or services offers would be counterproductive. As such, John is no longer a sales candidate. Metadata processing servers 140 may flag this updated information and communicate the same to the CRM system 150A, thus saving resources as the sales tame no longer attempts to reach out to John.

In the context of a support issue, John Doe may post a blog stating that "Something is wrong with my Nikon. I can't take a picture!" Metadata processing servers 140 aggregates this information and identifies this tweet as a sales lead for Nikon or its competitors. Alternatively or in addition, metadata processing servers 140 may also identify the tweet as a support request to Nikon. Information regarding the tweet (e.g., user account/contact information) may be directly exported to a third party support ticketing system. If, a few days later, John posts another blog stating that "Duh, did not know that the USB cable was faulty, the camera actually works great!," this indication that the user is not having any issues with the camera is sent to the ticketing system to update the support ticket automatically.

Figure 2:
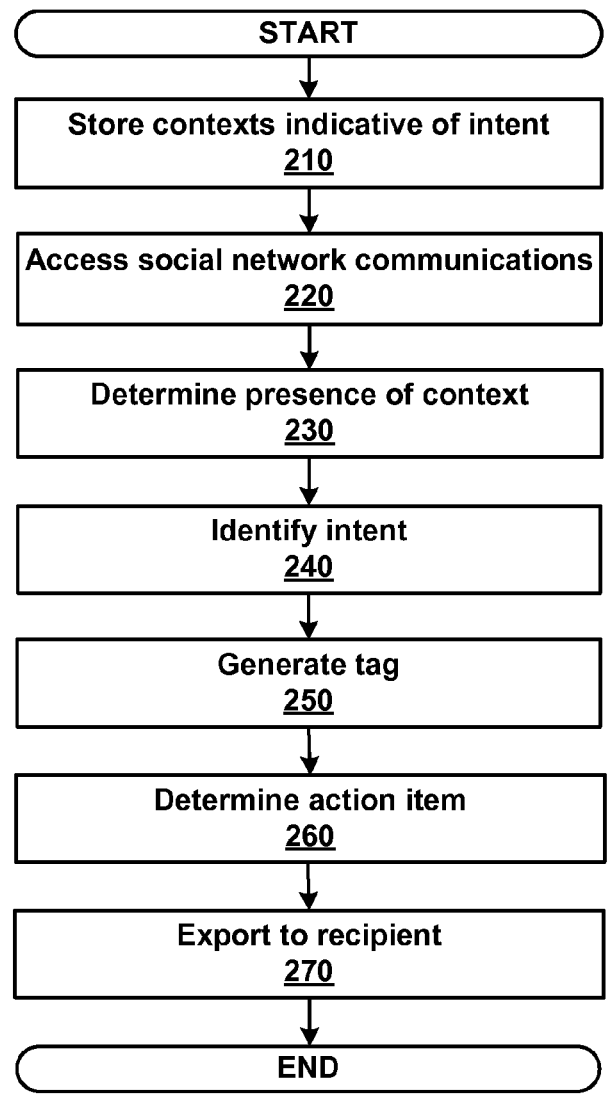
FIG. 2 is a flowchart illustrating an exemplary method for discerning human intent based on user-generated metadata.

FIG. 2 is a flowchart illustrating an exemplary method 200 for discerning human intent based on user-generated metadata. In the method, contexts indicative of a desired human intent are stored in memory. Social network communications may be accessed and determined to be associated with one of the contexts. Keywords, for example, may be identified as being associated with a context indicative of a desired human intent. A tag may be generated associated the identified human intent with the communication. In some embodiments, a responsive action item is determined based on the particular human intent identified. Information regarding the communication may be exported to a recipient designated as being responsible for the responsive action.

In step 210, various contexts indicative of a human intent of interest are stored in memory. Such contexts and/or intent(s) may be designated by a partner. For example, a particular camera manufacturer may be interested in intent to buy in association with instances of "camera," "digital camera," and "photography" in social network communications. The camera manufacturer may also be interested in such words in association with complaints or concerns from its recent customers.

In step 220, various social network communications are accessed. Such access may be obtained, for example, via a data feed associated with the social network. The particular social networks may also be designated by the partner with varying degrees of specificity. For example, the camera manufacturer may specify that it wishes to monitor communications posted to Twitter®. Alternatively, the camera manufacturer may only wish to monitor communications posted by members of a particular photography group on Facebook®. Depending on the particular social networks (and sub-networks) designated by the partner, various types of information published in such social networks and sub-networks may also be accessed for evaluation. A fan page on Facebook®, for example, may provide thematic or otherwise useful indicia for interpreting communications posted within. A communication simply stating "I want!" may not necessarily provide any useful information in and of itself, but if the communication is posted on a fan page devoted to the latest iPhone® model, metadata processing system 140 can discern that the intent expressed in the communication is related to that phone model. Prior to any further evaluations, the communications may be filtered to remove spam and duplications.

In step 230, the contexts designated in step 210 may be found to be present in the communications accessed in step 220. For example, the number of communications accessed in step 220 may be filtered a first time based on presence of keywords associated with the designated contexts, leaving only those communications including the keywords for further evaluation. In some cases, metadata associated with a communication may be extracted or extrapolated. Such metadata may also be searched and evaluated for relation to any of the designated contexts. In a search for online mentions of "laptops," for example, metadata processing servers 140 may automatically aggregate millions of mentions of laptops from all over the web, including tweets on Twitter®, Facebook® updates, MySpace® updates, blogs, comments, etc.

A set of proprietary algorithm(s) may then start filtering the information and identifying which pieces of aggregated metadata exhibit human intent in step 240. A communication having a keyword may be further evaluated for a context indicative of a desired intent. The set of communications remaining after step 230 may be further filtered based on the context of additional keywords. Metadata processing system 140 may have previously identified, for example, that a particular intent is indicated when one or more of the keywords appear in certain contexts. Defined and refined through various intelligent learning processes, contexts indicating intent to buy, for example, may include requests for recommendations, complaints about old camera models, additions to wishlists, etc. Such contexts may be identified in a particular communication and/or in surrounding communications, either by the user or by individuals who know the user.

In step 250, a tag is generated for a communication associated with the context indicative of a desired intent. Such a tag may be generated as part of a notification to a third-party application (e.g., 150A-150C) and may be used to aggregate communications (e.g., communications indicating intent to buy vs. communications indicating complaints about bugs), before or after export. The tag may further indicate the particular user account associated with the communication and other user information relevant to the identified intent. For example, the user account may be evaluated for additional contexts and other keywords of relevance to the intent. The results of such evaluation may also be associated with the tag.

A tag may also indicate that the particular social network communication is associated with additional data that may be useful to the camera manufacturer from the foregoing example. The social network communication may include a hyperlink, an identifier as to particular manufacturer, make/model, color, etc. For example, the social network communication may state that "I cannot wait to buy this cool new camera that I read about here: http://www.coolcamera.com/model1." The hyperlink may link to a page with additional data (e.g., FTP, SFTP, HTTP, HTTPS). The information regarding the linked site may also be tracked and evaluated in terms of influencing individuals, driving internet communications, and generating internet traffic.

In step 260, an action item may be determined in response to identification of the desired human intent. In some instances, a particular tag may be associated with a particular action item. For example, a communication tagged regarding an intent to buy may be associated with action items for following up with the user regarding sales, rebates, dealer locations/websites, etc.

In step 270, an appropriate recipient may be identified. For example, an entity responsible for the action item selected in step 260 may be determined. For example, classification algorithms might determine that a mention for a laptop might need to be exported to a CRM system 150A. Alternatively, the system might update exported information if new information is discovered that might change human intent of the originally exported metadata. If someone has published that "My laptop is too old, I need to get a new one," metadata processing servers 140 may identify such communication as a sales lead for laptop manufactures (e.g., Dell, Sony, Acer, Apple), which may then be sent this exported information into their respective CRM system 150A.

In another example, if someone posted that "My Dell Laptop is about to catch on fire, it's heating up," such a communication would indicate that the customer needs support. Metadata processing servers 140 may automatically determine that the communication is a support request and export information to a support system for further review. A support representative may then reach out to this user and suggest ways to remedy the problem. Optionally, further processing can be done to send identified metadata to support systems based on a model number or other distinguishable characteristics. In some instances, further classification may be performed to identify which third-party enterprise or cloud system the data should be exported. The particular partner may choose various formats in which information may be exported. The data may be exported manually, automatically, periodically, in batches based on a set number of leads per day, or in real-time.

The information being exported may include not only information regarding the particular communication, but also user account information, user profile information (e.g., user ID, user name, user alias, user demographic information, user activity history), and related communications by the user or the social network of the user. In addition, various metrics or analytical information may also be provided (e.g., user social graph regarding friends and contacts of the user).

In some instances, the partner is charged for receiving such information. The payment model may be based on payment for each sales lead or each support request exported. Alternatively, the partner may be charged for each communication processed or on a periodic basis (e.g., a set monthly fee). Billing and payment may be processed through methods presently known in the art.

The present invention may be implemented in an application that may be operable using a variety of end user devices. The present methodologies described herein are fully intended to be operable on a variety of devices. Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for discerning human intent based on metadata, the method comprising:
    receiving information over a communication network indicative of an interest in a topic and a human intent related to the topic;
    accessing a plurality of sources of digital data over the communication network, the plurality of sources publishing digital data regarding a plurality of different topics and indicative of a plurality of different human intents; and
    executing instructions stored in memory, wherein execution of the instructions by a processor:
        automatically filters the digital data based on language associated with the topic of interest,
        automatically refines the filtered results based on identifying one or more additional keywords or metadata indicative of common contexts from a set of a plurality of communications published in a same timeframe, the contexts indicative of human intents of interest, wherein the human intents of interest include intent to buy and dissatisfaction,
        automatically generates a tag associating the filtered and refined results with one or more action items associated with each human intent of interest,
        automatically exports a set of filtered and refined results that have been tagged in association with intent to buy to a first application for performing the one or more actions items associated with the intent to buy, and
        automatically exports a set of filtered and refined results that have been tagged in association with dissatisfaction to a second application for performing the one or more actions items associated with dissatisfaction.

2. The method of claim 1, further comprising storing information in memory regarding a plurality of topics, each topic associated with one or more keywords.

3. The method of claim 1, further comprising storing information in memory regarding a plurality of human intents, each human intent associated with one or more indicative contexts.

4. The method of claim 1, further comprising sending the tagged results to one or more designated recipients for performance of the action items.

5. The method of claim 1, further comprising identifying a user associated with each of the tagged results.

6. The method of claim 5, further comprising receiving subsequent digital data indicating that the user is no longer associated with the human intent of interest with respect to the topic, and updating the tag.

7. The method of claim 6, wherein a new action item associated with the updated tag cancels a previous action item associated with the user.

8. The method of claim 1, wherein the contexts include metadata associated with the language.

9. The method of claim 8, wherein the contexts include metadata in communications surrounding or responsive to the language.

10. The method of claim 8, wherein the contexts include metadata generated in a same timeframe as the language.

11. An apparatus for discerning human intent based on metadata, the apparatus comprising:
    a communication interface for communicating over a communication network to:
        receive information indicative of an interest in a topic and a human intent related to the topic, and
        access a plurality of sources of digital data, the plurality of sources publishing digital data regarding a plurality of different topics and indicative of a plurality of different human intents; and
    a processor for executing instructions stored in memory, wherein execution of the instructions by the processor:
        automatically filters the digital data based on language associated with the topic of interest,
        automatically refines the filtered results based on identifying one or more additional keywords or metadata indicative of common contexts from a set of a plurality of communications published in a same specified timeframe, the contexts indicative of human intents of interest, wherein the human intents of interest include intent to buy and dissatisfaction,
        automatically generates a tag associating the filtered and refined results with one or more action items associated with each human intent of interest,
        automatically exports a set of filtered and refined results that have been tagged in association with intent to buy to a first application for performing the one or more actions items associated with the intent to buy, and
        automatically exports a set of filtered and refined results that have been tagged in association with dissatisfaction to a second application for performing the one or more actions items associated with dissatisfaction.

12. The apparatus of claim 11, further comprising a memory for storing information in memory regarding a plurality of topics, each topic associated with one or more keywords.

13. The apparatus of claim 11, further comprising a memory for storing information in memory regarding a plurality of human intents, each human intent associated with one or more indicative contexts.

14. The apparatus of claim 11, wherein the communications interface sends the tagged results to one or more designated recipients for performance of the action items.

15. The apparatus of claim 11, wherein further execution of instructions by the processor identifies a user associated with each of the tagged results.

16. The apparatus of claim 15, wherein the communications interface receives subsequent digital data indicating that the user is no longer associated with the human intent of interest with respect to the topic, and updating the tag.

17. The apparatus of claim 16, wherein a new action item associated with the updated tag cancels a previous action item associated with the user.

18. The apparatus of claim 11, wherein the contexts include metadata associated with the language.

19. The apparatus of claim 18, wherein the contexts include metadata in communications surrounding or responsive to the language.

20. The apparatus of claim 18, wherein the contexts include metadata generated in a same timeframe as the language.

21. A non-transitory computer-readable storage medium, having embodied thereon a program executable by a processor to perform a method for discerning human intent based on metadata, the method comprising:

receiving information over a communication network indicative of an interest in a topic and a human intent related to the topic;

accessing a plurality of sources of digital data over the communication network, the plurality of sources publishing digital data regarding a plurality of different topics and indicative of a plurality of different human intents;

automatically filtering the digital data based on language associated with the topic of interest;

automatically refining the filtered results based on identifying one or more additional keywords or metadata indicative of common contexts from a set of a plurality of communications published in a same specified timeframe, the contexts indicative of human intents of interest, wherein the human intents of interest include intent to buy and dissatisfaction;

automatically generating a tag associating the filtered and refined results with one or more action items associated with each human intent of interest;

automatically exporting a set of filtered and refined results that have been tagged in association with intent to buy to a first application for performing the one or more actions items associated with the intent to buy; and automatically exporting a set of filtered and refined results that have been tagged in association with dissatisfaction to a second application for performing the one or more actions items associated with dissatisfaction.

* * * * *